United States Patent
Hammond

(10) Patent No.: US 9,446,985 B2
(45) Date of Patent: Sep. 20, 2016

(54) METHOD OF TREATING CELLULOSE MATERIAL WITH $CO_2$ OR SOURCE THEREOF

(75) Inventor: Peter Hammond, Oxfordshire (GB)

(73) Assignee: CCM RESEARCH LIMITED, Gloucestershire (GB)

( * ) Notice: Subject to any disclaimer, the term of this patent is extended or adjusted under 35 U.S.C. 154(b) by 829 days.

(21) Appl. No.: 13/496,031

(22) PCT Filed: Sep. 17, 2010

(86) PCT No.: PCT/GB2010/051563
§ 371 (c)(1),
(2), (4) Date: Mar. 14, 2012

(87) PCT Pub. No.: WO2011/033311
PCT Pub. Date: Mar. 24, 2011

(65) Prior Publication Data
US 2012/0168698 A1    Jul. 5, 2012

(30) Foreign Application Priority Data

Sep. 18, 2009 (GB) .................................. 0916485.6

(51) Int. Cl.
| | |
|---|---|
| C04B 18/26 | (2006.01) |
| C04B 20/04 | (2006.01) |
| C04B 20/10 | (2006.01) |
| C04B 20/12 | (2006.01) |
| B01J 20/22 | (2006.01) |
| C08K 5/00 | (2006.01) |
| C09K 21/00 | (2006.01) |
| C04B 103/63 | (2006.01) |

(52) U.S. Cl.
CPC ............ *C04B 18/26* (2013.01); *C04B 20/104* (2013.01); *C04B 20/107* (2013.01); *C04B 20/12* (2013.01); *C04B 2103/63* (2013.01); *Y02W 30/97* (2015.05)

(58) Field of Classification Search
None
See application file for complete search history.

(56) References Cited

U.S. PATENT DOCUMENTS

| | | | |
|---|---|---|---|
| 2,793,930 A | | 5/1957 | Compton et al. |
| 3,027,740 A | * | 4/1962 | Sonnino .......................... 68/5 E |
| 3,443,009 A | * | 5/1969 | Chirgwin, Jr. ......... 264/342 RE |
| 3,825,469 A | | 7/1974 | Economy et al. |
| 4,077,771 A | | 3/1978 | Kuroki et al. |
| 4,475,917 A | | 10/1984 | Ohshima et al. |
| 5,455,065 A | | 10/1995 | Rood |
| 6,843,844 B1 | | 1/2005 | Van Horn |
| 2003/0150065 A1 | | 8/2003 | Hu et al. |
| 2009/0025555 A1 | * | 1/2009 | Lively et al. .................... 95/114 |
| 2009/0130321 A1 | | 5/2009 | Liu |
| 2009/0294366 A1 | * | 12/2009 | Wright et al. ................. 210/683 |
| 2010/0236242 A1 | * | 9/2010 | Farsad et al. .................... 60/685 |
| 2010/0239487 A1 | * | 9/2010 | Constantz et al. ............ 423/430 |
| 2010/0313758 A1 | * | 12/2010 | Stevens et al. .................... 96/10 |
| 2010/0331457 A1 | | 12/2010 | Buri et al. |

FOREIGN PATENT DOCUMENTS

| | | |
|---|---|---|
| DE | 19618444 A1 | 11/1997 |
| DE | 102007019783 A1 | 10/2008 |
| DE | 102007059736 A1 | 6/2009 |
| EP | 0457634 A1 | 11/1991 |
| EP | 1057919 A2 | 12/2000 |
| EP | 0801164 B1 | 2/2004 |
| GB | 220677 | 8/1924 |
| GB | 435129 | 9/1935 |
| GB | 538396 | 8/1941 |
| GB | 1113604 | 5/1968 |
| GB | 2437280 | 10/2007 |
| JP | 5161843 A | 6/1993 |
| JP | 2003138478 A | 5/2003 |
| JP | 2005264396 A | 9/2005 |
| WO | 9949133 A1 | 9/1999 |
| WO | 0015668 A1 | 3/2000 |
| WO | 0132974 A2 | 5/2001 |
| WO | 2005002530 A1 | 1/2005 |
| WO | 2005121447 A1 | 12/2005 |
| WO | 2007050245 A2 | 5/2007 |
| WO | 2008021700 A1 | 2/2008 |
| WO | 2009061470 A1 | 5/2009 |
| WO | 2010057743 A2 | 5/2010 |
| WO | 2010091831 A1 | 8/2010 |

OTHER PUBLICATIONS

Patent Cooperation Treaty, PCT International Search Report and Written Opinion of the International Searching Authority for PCT/GB2010/051563 dated Mar. 3, 2011, 11 pages.
GB Intellectual Property Office, Combined Search and Examination Report under Sections 17 &18(3) for Application GB1015582.8, 5 pages.
Patent Cooperation Treaty, PCT Notification Concerning Transmittal of International Preliminary Report on Patentability and Written Opinion of the International Searching Authority for PCT/GB2010/051563 dated Mar. 29, 2012, 8 pages.
Patent Examination Report No. 2 for AU Patent Application No. 2010297039, dated Jan. 17, 2014, 5 pages.

* cited by examiner

*Primary Examiner* — Joseph D Anthony
(74) *Attorney, Agent, or Firm* — Hoffman Warnick LLC

(57) ABSTRACT

The present invention relates to materials having improved and useful properties and to methods relating to the manufacture of said materials. In particular the present invention relates to a method of modifying the surface of a material, preferably a fibrous material, to enable carbon dioxide to be carried by the surface. The carbon dioxide may be bound to the surface in a reversible or irreversible manner. The method of treating the surface of a material comprises (a) contacting the surface of the material with a composition comprising an amino compound; and (b) contacting the surface of the material with a composition comprising carbon dioxide or a source thereof.

12 Claims, No Drawings

METHOD OF TREATING CELLULOSE MATERIAL WITH $CO_2$ OR SOURCE THEREOF

The present invention relates to materials having improved and useful properties and to methods relating to the manufacture of said materials. In particular the present invention relates to a method of modifying the surface of a material to enable carbon dioxide to be carried by the surface. The carbon dioxide may be bound to the surface in a reversible or irreversible manner.

For environmental reasons there is an increasingly urgent need to reduce emissions of carbon dioxide into the atmosphere. It is also very beneficial to provide means to remove carbon dioxide from the atmosphere.

It is an aim of the present invention to provide a method by which carbon dioxide can be incorporated into or assist the formation of a useful product.

According to a first aspect of the present invention there is provided a method of treating the surface of a material, the method comprising the steps of:
(a) contacting the surface of the material with a composition comprising an amino compound; and
(b) contacting the surface of the material with a composition comprising carbon dioxide or a source thereof.

Any suitable material may be treated by the method of the present invention. In preferred embodiments the material is a carbon-containing material. The material may be a natural material or it may be a synthetic material, or it may be a semi-synthetic material, for example a natural material processed into a different form. It may be a cellulosic material, including a natural cellulosic material or a semi-synthetic, processed, cellulosic material, for example, rayon or lyocell. In some preferred embodiments the material treated by the method of the present invention is a fibrous material. The material may comprise natural fibres and/or synthetic fibres and/or semi-synthetic fibres, for example regenerated cellulose products. Suitable synthetic fibres include polyamides, polyesters and polyacrylics. Preferably the material comprises natural fibres.

The use of natural fibres may help improve the environmental profile of the material treated by the method of the present invention.

Suitable natural fibres for use in the method of the present invention include cotton, hemp, flax, silk, jute, kenaf, ramie, sisal, kapok, agave, rattan, soy bean, vine, banana, coir, stalk fibres and mixtures thereof.

Suitably fibres for use in the present invention may be provided as strands or agglomerations, in sizes to suit the intended application.

Steps (a) and (b) of the present invention may be carried out sequentially or simultaneously. In preferred embodiments steps (a) and (b) are carried out sequentially. In especially preferred embodiments step (b) is carried out after step (a) and thus step (b) comprises contacting the surface of a material which has been contacted with a composition comprising an amino compound with a composition comprising carbon dioxide or a source thereof. Thus step (b) suitably involves contacting a surface carrying an amino compound with a composition comprising carbon dioxide or a source thereof.

However embodiments of the present invention in which steps (a) and (b) are carried out simultaneously, that is the surface of a material is treated with a single composition comprising an amino compound and carbon dioxide or a source thereof are also within the scope of the invention.

Step (a) comprises contacting the surface of the material with a composition comprising an amino compound. The amino compound may be any compound containing an amino or substituted amino moiety for example ammonia, an aliphatic or aromatic amine, an amide or urea. Preferably the amino compound is selected from ammonia or an amine. Any suitable amine may be used including aromatic and aliphatic amines. Preferred amines are aliphatic amines for example alkyl amines, alkenyl amines or alkynyl amines. Such amines may be substituted or unsubstituted. Suitable substituted amines include amino acids and alcohol amines (alkanolamines), for example of formula $R^1R^2R^3N$ where $R^1$ is a group of formula HO—X— where X represents a $C_{1-4}$ alkylene group, preferably an ethylene group, $R^2$ represents a hydrogen atom or a group of formula HO—X—, and $R^3$ represents a hydrogen atom or a group of formula HO—X— (the groups X being the same or different). Monoalkanolamines and dialkanolamines are preferred, especially ethanolamine (diethanolamine and/or monoethanolomine).

Especially preferred amines for use herein are alkyl amines, most preferably unsubstituted alkyl amines and alkanolamines.

The amino compound may be ammonia, a primary amine, a secondary amine or a tertiary amine. Preferred amines for use in step (a) of the present invention are primary amines, secondary amines, or mixtures thereof. Especially preferred amines for use herein are primary or secondary alkyl amines, especially alkyl amines having up to 12 carbon atoms, preferably up to 10 carbon atoms, suitably up to 8 carbon atoms, more preferably up to 6 carbon atoms, for example up to 4 carbon atoms. Preferred amines for use herein are methylamine, dimethylanine, ethylamine, diethylamine, propylamine, dipropylamine, butylamine, dibutylamine and mixtures and isomers thereof. In an especially preferred embodiment step (a) comprises contacting the surface of the material with a composition comprising ethylamine, diethylamine or a mixture thereof.

The composition used in step (a) of the present invention may comprise neat concentrated amino compound in gaseous or liquid form or it may comprise one or more further components including for example a diluent or carrier. Preferably the composition used in step (a) is a liquid composition. This may be applied by any suitable technique such as will be well known to the person skilled in the art. For example it may be applied by spraying, padding or, immersion. Suitably a solution of amine in a solvent may be applied to the material and then the material dried to effect evaporation of excess solvent and/or amine. Suitable solvents include water, organic solvents and mixtures thereof. In some embodiments the composition used in step (a) comprises an amino compound provided as a vapour. Suitably in such embodiments the material is placed in a sealed vessel and the amino compound vapour is then passed through the vessel.

In preferred embodiments step (a) comprises applying a composition comprising at least 10 wt % amino compound, preferably at least 20 wt % amino compound, suitably at least 40 wt %, at least 60 wt % or at least 80 wt %. Suitably step (a) comprises applying a composition comprising at least 90 wt % amino compound, for example at least 95 wt % or at least 98 wt %.

Preferably the composition containing an amino compound contains at least 5 wt % water, preferably at least 10 wt % water, most preferably at least 20 wt % water.

Preferably compositions for use in step (a) consist essentially of water and the amino compound. The amino compound is preferably in an amount as defined above and the water is the balance of the composition.

In some preferred embodiments the composition comprises the amino compound as a neat liquid. The skilled person will however appreciate that commercially available amines often contain mixtures and/or impurities.

However, the presence of water in the composition containing the amino compound is believed to be beneficial and is preferred.

An excess of amino compound may be applied in step (a) and this excess may be optionally removed at the end of step (a) prior to step (b).

Step (b) of the present invention comprises contacting the surface of the material with a composition comprising carbon dioxide or a source thereof. Preferably step (b) is carried out after step (a) and thus the material has already been contacted with an amino compound.

The composition used in step (b) may comprise carbon dioxide itself or it may comprise a material which can release carbon dioxide or a material which can be prepared from carbon dioxide. Examples of such materials include hydrogen carbonate salts and carbonate salts.

Suitable carbonate salts include salts of divalent metals especially alkaline earth metals. Most preferred carbonate salts include calcium carbonate and magnesium carbonate.

Suitable hydrogen carbonate salts are salts of monovalent metals and ammonium. Especially preferred are alkali metal hydrogen carbonate salts. Most preferred are sodium hydrogen carbonate, potassium hydrogen carbonate and lithium hydrogen carbonate.

The composition used in step (b) may comprise neat carbon dioxide or carbon dioxide source or it may comprise further components including, for example, a diluent or carrier. In some embodiments the composition may comprise one or more further components to be deposited on the surface of the material.

In especially preferred embodiments, step (b) comprises contacting the surface of the material with a composition comprising carbon dioxide.

Preferably step (b) comprises contacting the surface of the material with a composition comprising carbon dioxide. The carbon dioxide may be provided neat as carbon dioxide gas or as supercritical carbon dioxide. Alternatively the carbon dioxide may be incorporated into a liquid composition. In some embodiments the carbon dioxide may be dissolved in water. In some especially preferred embodiments the carbon dioxide is dissolved in superheated water.

In embodiments in which step (b) comprises treating the surface of the material with a composition comprising carbon dioxide dissolved in water or superheated water this may suitably be present as carbonic acid.

In some preferred embodiments the method of the present invention includes a pre-treatment step prior to step (a). Suitably the pre-treatment step may effect modification of the surface of the material. It is believed that the inclusion of such a pre-treatment step may aid subsequent interaction of the surface with the amino compound.

The pre-treatment step may involve heating the material. The material may be heated in an inert atmosphere, in the air or in a particularly selected atmosphere.

In some embodiments the pre-treatment step may involve contacting the material with a pre-treatment composition. The pre-treatment composition may be a gas, a liquid or a solid, for example a particulate material. Preferably the pre-treatment composition is a liquid composition. More preferably the pre-treatment composition comprises a solvent.

In some preferred embodiments the pre-treatment step involves contacting the material with a heated liquid composition, preferably a heated solvent. In some embodiments the pre-treatment step involves heating the material with an aqueous composition (which may include water per se). Preferably the pre-treatment step involves contacting the material with a heated aqueous composition, preferably water. Most preferably the pre-treatment step involves contacting the material with superheated water.

Superheated water is water that is in liquid form at a temperature of greater than 100° C. It is maintained as a liquid by the application of pressure. Superheated water has a temperature which is between the normal boiling point of 100° C. and the critical temperature of 374° C. Preferably the pre-treatment step of the present invention involves contacting the material with superheated water at a temperature of at least 110° C., preferably at least 125° C., more preferably at least 140° C., preferably at least 150° C., more preferably at least 160° C., for example at least 170° C. Suitably the pre-treatment step involves contacting the material with superheated water having a temperature of up to 370° C., suitably up to 330° C., preferably up to 300° C., for example up to 270° C., suitably up to 240° C., preferably up to 230° C., for example up to 220° C., suitably up to 210° C., for example up to 205° C.

Suitably the pre-treatment step, when carried out, involves contacting the material with superheated water having a temperature of from about 150° C. to about 200° C. A typical pressure will be from 500 to 5000 kPa, for example from 1000 to 4000 kPa, suitably from 1500 to 3000 KPa. However the skilled person will know the pressure needed to provide superheated water of the desired temperature.

The pre-treatment step of contacting the material with superheated water may be achieved by any suitable means as will be readily understood by the person skilled in the art. Preferably the pre-treatment step involves pumping superheated water through a portion of the material. Thus the material will typically be placed in a vessel through which superheated water is pumped. Preferably in the pre-treatment step the material is contacted with the superheated water for at least 10 seconds, preferably at least 30 seconds, suitably at least 45 seconds, preferably at least 60 seconds. The pre-treatment step may involve contacting the material with the superheated water for a period of up to an hour, for example up to 45 minutes, preferably up to 30 minutes, suitably up to 20 minutes, for example up to 15 minutes.

Suitably following the pre-treatment step of contacting the material with superheated water the material may optionally be dried. One suitable method of drying the material is to pass an inert gas, for example nitrogen through the vessel in which the treatment is being carried out.

It should be noted however that in embodiments of the invention effective carbon dioxide capture has taken place without any such pre-treatment steps; with the amine solution simply being applied to as-supplied material; for example as-supplied fibres.

Step (a) of the method of the present invention is thus preferably, but not essentially, carried out on a material which has been pre-treated with superheated water. Step (a) involves contacting the material with a composition comprising an amino compound. Preferably step (a) involves contacting the material with a liquid composition comprising an amino compound. Most preferably step (a) involves contacting the material with neat amino compound. Step (a) may be carried out at any suitable temperature and pressure. Suitable temperatures are from 0 to 80° C., for example from 5 to 60° C., suitably from 10 to 40° C., for example from 15 to 35° C. Suitably in step (a) the material is contacted with a composition comprising an amino compound at room temperature. Step (a) may be carried out under high pressure. However in preferred embodiments step (a) involves contacting the material with an amino compound under standard atmospheric pressure.

Suitably in step (a) of the method of the present invention an interaction occurs between the surface of the material and the amino compound. In preferred embodiments in which the material has been pre-treated, for example by contacting with superheated water, this interaction is suitably enhanced. Any type of interaction may occur and depends on the particular amino compound and the material involved. For example a simple electrostatic interaction may occur, dipole-dipole interactions may occur, hydrogen bonding may occur, or a full covalent bond may be formed between the amino compound and the surface of the material.

In preferred methods in which the material is a cellulosic and/or fibrous material the surface of the material and the amino compound are believed to interact in a way which (though not at present fully understood) appears to promote the take-up of carbon dioxide in step (b).

Without being bound by theory, in some preferred embodiments in which the material comprises natural fibres it is believed that hydrogen bonding occurs between the amino functionality and the surface. It is believed that such hydrogen bonding interactions between the amino compound and the surface of the material are enhanced when the material is first treated with superheated water as the pre-treatment step disrupts the existing hydrogen bonds within the material itself.

Preferably step (a) of the method of the present invention involves contacting the material with a composition comprising an excess of amino compound. The excess amino compound may optionally be removed following step (a).

Preferably step (a) involves contacting the material with a composition comprising an amino compound for at least 5 seconds, preferably at least 20 seconds, more preferably at least 30 seconds, for example at least 45 seconds. The composition comprising the amino compound may suitably be contacted with the material for a period of up to 1 hour, for example up to 45 minutes or up to 30 minutes.

Preferably the present invention involves a first pre-treatment step of contacting the material with superheated water followed by step (a) of contacting the material with a composition comprising an amino compound. However in some embodiments these steps could be combined and the material could be treated with a composition comprising an amino compound dissolved in superheated water.

Step (b) of the method of the present invention involves contacting the material with a composition comprising carbon dioxide or a source thereof. Steps (a) and (b) may be combined and the method of the present invention may involve contacting a material with a composition comprising an amino compound and carbon dioxide or a source thereof. However, in preferred embodiments step (b) is carried out after step (a) and thus involves contacting a material carrying an amino compound at the surface with a composition comprising carbon dioxide or a source thereof.

All steps of the method of the present invention may be carried out in the same vessel. Thus the method may be regarded as a "semi-continuous" process.

Preferably in step (a) the material is contacted with a composition comprising an amino compound and then in step (b) material is treated with a composition comprising carbon dioxide or a source thereof. In some embodiments in which the material is contacted with a composition comprising carbon dioxide, neat carbon dioxide may be provided in gaseous form. Suitably carbon dioxide gas may be pumped into the vessel containing the material. In some embodiments the material may have been dried following step (a). Alternatively the material may still be damp. In embodiments in which the material is contacted with carbon dioxide gas this may be provided at a pressure of from up to 40,000 kPa, preferably from 0.5 to 40,000 kPa, preferably from 1 to 40,000 kPa, preferably 10 to 40,000 kPa, preferably 30 to 40000 kPa, preferably from 100 to 30000 kPa, suitably 120 to 10000 kPa, for example from 150 to 3000 kPa. In some embodiments carbon dioxide may be delivered to the material at ambient pressure, and preferably at ambient temperature. In preferred embodiments the carbon dioxide gas is at a supra-atmospheric pressure.

In some embodiments step (b) could be carried out in an environment which is naturally high in carbon dioxide, for example in the vicinity of a power station. Thus the present invention may involve a method of capturing carbon from the atmosphere.

In some alternative embodiments step (b) may comprise contacting the material with a composition in which carbon dioxide is dissolved or dispersed in a solvent to provide a liquid composition. In some preferred embodiments carbon dioxide is dissolved in an aqueous composition. Preferably in aqueous compositions the carbon dioxide may be dissolved to form carbonic acid and the composition will have an acidic pH, for example a pH of from about 2 to about 4.

In some preferred embodiments the carbon dioxide may be dissolved in superheated water. In such embodiments it is preferred that step (b) comprises contacting the material with carbon dioxide in water at a temperature of at least 120° C., preferably at least 150° C., for example at least 170° C. Step (b) may comprise contacting the material with a composition comprising carbon dioxide dissolved or dispersed in superheated water at a temperature of up to 350° C., for example up to 320° C., suitably up to 300° C., for example up to 275° C. or up to 260° C. In some especially preferred embodiments step (b) comprises contacting the material with a composition comprising carbon dioxide dissolved in superheated water at a temperature of about 175 to about 250° C., preferably about 225° C. to about 250° C.

In embodiments in which carbon dioxide is dissolved in superheated water, it may be provided as a saturated solution.

Without wishing to be bound by theory it is believed that the carbon dioxide interacts with the amino compound which is carried by the surface of the material following step (a). The nature of this interaction is not fully understood. It is believed that there may be a polar interaction, a hydrogen bond may form or covalent bonding may occur.

In some embodiments the present invention provides a material which has been optionally pre-treated by contacting with superheated water, contacted with a composition comprising an amino compound according to step (a) and contacted with a composition comprising carbon dioxide or a source thereof according to step (b) and which may be useful as a means of storing carbon dioxide. The method may provide a composite material in which carbon dioxide is retained on the surface of a fibrous structure via an amino linkage. The carbon dioxide may be permanently retained or bonded or it may be retained in a manner such that it could be released later in a subsequent application of the material. Hence the carbon dioxide may be fixed to the surface of the material in a reversible or irreversible manner.

In some especially preferred embodiments the carbon dioxide is retained on the surface in a substantially irreversible manner. By this we mean that carbon dioxide is not readily released from the material under the normal conditions in which the material is used. In the case of a building material, for example, carbon dioxide is not usually released under any normal weather conditions. Thus the material is preferably stable at all humidities, at standard atmosphere pressure and at temperatures of between −30° C. and 60° C., for example between −10° C. and 40° C. The material is suitably weatherproof and carbon dioxide is not released under extremes of heat or cold or in very wet, very dry, windy or stormy environments.

My experimental work has shown that the amount of carbon dioxide which can be retained by the method is in excess of the amount calculated on the basis of the expected reaction(s) between the carbon dioxide and the amine. This was unexpected and is of great potential value in carbon dioxide capture. The excess can be at least 10 wt %, preferably at least 20 wt %, over the calculated or stoichiometric amount.

Materials in which the carbon dioxide is permanently bonded to the surface of a fibrous material may be used as building composite building materials. These materials will have a much more environmentally friendly profile than existing building materials particularly in the case where a natural fibre from renewable sources is used as the base fibre material. Such composite materials could be used, for example, in the manufacture of bricks or breeze blocks.

Preferably in the materials obtained by the method of the present invention the carbon dioxide is retained on the surface of the material and is fixed in a substantially irreversible manner. However embodiments in which the carbon dioxide is reversibly bound to the material are within the scope of the present invention.

For example during the processing of some materials, it is sometimes desirable to add a gas during processing to assist with mixing of the material. One such gas used is carbon dioxide. It would therefore be advantageous to provide a material in which carbon dioxide is incorporated and can be later released when necessary. Release could be triggered by application of a chemical agent, for example an acid. Alternatively release could be triggered by heating the material. The method of the present invention could thus be used to make a material in which the carbon dioxide can be released at a later stage.

For example fibres coated with an amino could be exposed to carbon dioxide before being added to a polymer melt. The carbon dioxide screens the amine from the polymer melt, preventing premature or uncontrolled curing. The carbon dioxide can migrate or be driven off, allowing the amino compound to be exposed to the polymer in a controlled manner. The carbon dioxide may reduce the density of the molten polymer and improve its handling and flow properties, for example during extrusion or moulding.

In step (b) of the method of the present invention a composition comprising carbon dioxide in superheated water is preferably contacted with the material for a period of at least 10 seconds, preferably at least 30 seconds, suitably at least 45 seconds. It may be applied for a period of up to 1 hour, for example up to 45 minutes, or up to 30 minutes.

Preferably step (b) comprises contacting the material with the composition and then initiating precipitation from said composition onto the surface of the material. Initiation of precipitation may for example be effected by a lowering of the temperature. Thus step (b) may comprise applying to the material a composition comprising carbon dioxide and then lowering the temperature of the composition.

The method of the present invention may further comprise contacting the material with one or more benefit agents. Preferred benefit agents include minerals, for example phosphates and sulfate salts. Especially preferred are alkaline earth metal phosphates, for example magnesium and calcium phosphates, with calcium phosphates being especially preferred. Hydroxyapatite materials can thus be formed.

Suitably in step (b) of the method of the present invention a composition comprising carbon dioxide and optionally one or benefit agents, for example mineral salts is contacted with the material. The composition is suitably cooled (or allowed to cool) and/or the pressure thereof is reduced. A reduction in pressure and/or temperature may lead to a release of carbon dioxide from the composition. This carbon dioxide may interact with the amino residue carried by the surface of the material. As carbon dioxide is released from the composition, the pH of the composition suitably increases which may reduce the solubility of any additional mineral salts dissolved therein. These salts may then precipitate onto the surface of the material effectively "fixing" the carbon dioxide and amino compound to the surface.

An advantage of the method of the present invention is that it is highly flexible. By varying the temperature and/or the pH and/or the concentration of carbon dioxide and/or further components (such as benefit agents) in the composition, it is possible to significantly affect the properties of the material obtained by the method of the present invention. Thus the method of the present invention may be adapted to deliver a material having particular desired properties. The method could be used to produce a very hard stone-like material or a softer more chalk-like material. As a result the potential utility of products prepared by the method of the present invention is wide and varied.

The choice of a suitable benefit agent may depend on the intended end use of the material produced by the method. If the material is intended to be used in building applications then a mineral such as a phosphate may be used. The selection of an appropriate benefit agent may allow the production of a material having a particular property. For example the inclusion of a benefit agent comprising a halogenated compound or a phosphate component may enable the method of the present invention to be used to provide a product having flame retardant properties.

In some embodiments in which the surface of the material has been adapted such that it carries carbon dioxide, it could then be contacted with a composition comprising a further benefit agent which allows metal to be deposited onto the surface of the material. This could provide a material which is magnetically and/or electrically conducting.

In preferred embodiments of the present invention the one or more additional benefit agents may be included in the composition applied to the material in step (b).

In alternative embodiments the method of the present invention may comprise one or more additional steps which are carried out after step (b) in which the material is contacted with a composition comprising one or more further benefit agents. Such compositions may comprise a diluent or solvent, for example water. Thus the present invention may comprise a further step after step (b) of contacting the material with an aqueous composition comprising one or more benefit agents. Such an aqueous composition may suitably be heated, for example to a temperature of from 40 to 95° C., suitably from 50 to 90° C., for example from 60 to 80° C. The further step may comprise contacting the material with a composition at this temperature and then allowing the temperature to fall (or actively cooling the composition) in order that the one or more further benefit agents are deposited (for example by precipitation) onto the surface of the material. Alternatively or additionally the deposition onto the surface of the material may be initiated by a change in pH and/or a change in pressure.

However in especially preferred embodiments step (b) comprising contacting the material with a composition comprising superheated water having dissolved therein carbon dioxide and one or more benefit agents.

The deposition of the carbon dioxide and/or one or more benefit agents onto the surface of the material may be initiated by a drop in pressure and/or temperature and/or a change in pH.

The method of the present invention may comprise one or more additional steps in which a mineral or other material is deposited onto the surface of a material by precipitation from a composition which is contacted with the material. The flexibility of the method of the present invention allows the size of the particles deposited on to the material to be controlled. It has been found that particles having a size range of from $10^{-9}$ m to $10^{-9}$ m can be deposited onto the surface of a material. Such a large range of possible particle sizes means that composite materials having a wide range of properties can be produced.

Products of the invention may be monolithic solids, granular solids, elongate particulates, liquids or slurries. Monolithic solids may be used as such, or after pressing or machining to shape. Granular solids may be compressed to form monolithic solids. Granular solids or elongate particulates may be used as reinforcing materials, for example in concrete or polymeric materials. Granular solids may be used to give reinforced products having isotropic properties. Elongate particulates may be used to give reinforced products having anisotropic properties, arising from control of the orientation of the elongate particulates. Liquids or slurries may be used as such in concrete or may be dried, for other uses.

In a preferred embodiment the present invention provides a method of treating the surface of a material, the method comprising the steps of:
(i) optionally contacting the material with superheated water;
(ii) contacting the surface of the material with a composition comprising an amino compound;
(iii) contacting the surface of the material with a composition comprising carbon dioxide or a source thereof; and
(iv) optionally contacting the material with a composition comprising one or more benefit agents.

Any of steps (i) to (iv) may be combined and/or repeated.

According to a second aspect of the present invention there is provided a material treated according to the first aspect.

The material treated with the amino compound may be stored or transported, for later treatment with carbon dioxide. Therefore such material is a potential article of commerce and represents a third aspect of the present invention.

Preferred features of the second or third aspect are as defined in relation to the first aspect.

Due to the diversity of the method of the first aspect, the products of the second or third aspect may also vary significantly.

In some embodiments the material could be used in construction for example as a filler in concrete. This would provide a more environmentally friendly concrete in which large volumes of carbon dioxide are stored within the material. It is believed that up to 200 kgm$^{-3}$ could be incorporated into such a material.

The density of the material provided by the present invention may vary considerably depending on the conditions used to prepare the material. For example a very dense hard material may be produced or a lighter more porous product may be formed.

A material provided by the present invention may be useful as a thermal insulating material in buildings, particularly when a low density product is desired.

A number of specialist applications for the products provided by the present invention are envisaged.

The method could be used to produce a material which is a good electrical or thermal insulator. The method could be used to produce a material having good electrical, magnetic or heat conducting properties.

The method could be used to produce panels reinforced with elongate particulates prepared using the method of the invention. The panels or sheets could be cementitious or polymeric.

The method could be used to produce a material having flame retardant properties.

The present invention may also provide materials having utility in the medical sector. It is believed that the method could be used to produce a bio-compatible material. For example a low density porous material could be used as a bone scaffold. It is also envisaged that porous products could be used to provide a delivery system for slow release drugs.

The present invention provides a method for producing a wide range of materials having very many different properties. However all of these materials incorporate carbon dioxide and have a good environmental profile, especially when based on natural fibres which are grown from renewable sources. A further advantage of using natural fibres is that they may promote advantageous crystal growth.

In embodiments in which the method is carried out on a large scale, for example in the production of building materials, it would be advantageous to carry out the method in the vicinity of a power station. Power stations produce large quantities of carbon dioxide and hot water and these by-products could be used directly in the method of the present invention to provide useful composite construction materials.

By way of example only the preparation of materials according to the present invention will now be further described.

EXAMPLE 1

A vessel was charged with a mass of cotton fibres followed by superheated water at a temperature of 180° C. The fibres were immersed in the superheated water for 5 minutes before it was pumped away.

The vessel was then charged with excess ethylamine and left for 10 minutes under ambient conditions.

A composition was prepared by superheating water under pressure to a temperature of 225° C. Carbon dioxide gas was pumped into the superheated water to achieve saturation and the composition was also saturated with calcium phosphate. The dissolution of high levels of carbon dioxide lowers the pH of the composition which then allows high concentrations of calcium phosphate to be achieved.

The superheated composition was delivered into the vessel containing the material which was under ambient conditions. This vessel was then sealed. Due to the immediate drop in pressure and temperature, carbon dioxide was released from the composition and this binds to the fibres.

Loss of carbon dioxide from the superheated composition causes the pH of the composition to increase which, together with the drop in pressure, leads to a reduction in the solubility of the calcium phosphate. This then also precipitates rapidly onto the surface of the fibres locking in the carbon dioxide. After 5 minutes excess composition was pumped from the material and recycled.

The material thus obtained is of a gritty texture. It can be dried to form a useful composite building material. Alternatively the wet material can be directly incorporated into cement.

The properties of the material obtained vary according to the rate of cooling of the composition. In some embodiments a very rapid cooling may be used. In alternative embodiments the composition may be allowed to cool slowly to room temperature. The material obtained in each case would have very different properties.

EXAMPLE 2

In this simple embodiment waste paper crumb from a paper mill, as supplied and without any pre-treatment, and at ambient temperature and pressure, was soaked in excess 70 wt % aqueous diethanolamine solution for 10 minutes and drained of excess diethanolamine solution. 30 wt % calcium hydroxide on dry fibre weight was mixed in. Resulting material was placed in a 6 cm diameter petri dish, in a sealed vessel, at ambient temperature and pressure, and subjected to flow-through of carbon dioxide for 30 minutes. Carbon dioxide was absorbed and by the end of the process there was a monolithic block which could be lifted from the petri dish. The block was light but had reasonably good mechanical properties and could be suitable for use as a thermal insulating material in buildings.

The invention claimed is:

1. A method of treating the surface of a material, the method comprising the steps of:
   (a) contacting the surface of the material with a composition comprising at least 40 wt % of ammonia; and
   (b) contacting the surface of the material with a composition comprising carbon dioxide having a pressure of between 150 kPa and 3000 kPa,
   wherein the material is a cellulosic material comprising natural fibers, and wherein the composition used in step (b) comprises neat carbon dioxide or further comprises a diluent or carrier.

2. The method as claimed in claim 1, wherein step (b) is carried out after step (a).

3. The method as claimed in claim 2, wherein the composition used in step (a) is a liquid composition comprising a solution of the ammonia in a solvent, preferably water.

4. The method as claimed in any preceding claim 1, wherein the method includes a pre-treatment step prior to step (a), wherein the pre-treatment step involves heating the material.

5. The method as claimed in claim 1, wherein step (b) comprises contacting the material with the composition and then initiating precipitation from said composition onto the surface of the material.

6. The method as claimed in claim 1, wherein the method further comprises contacting the material with one or more mineral.

7. The method as claimed in claim 1, wherein step (b) comprises contacting the material with a composition comprising superheated water having dissolved therein carbon dioxide and one or more benefit agents, and wherein the deposition of the carbon dioxide and/or one or more benefit agents onto the surface of the material may be initiated by a drop in pressure and/or a drop in temperature and/or a change in pH.

8. The method as claimed in claim 1, wherein the treated material contains a mass of carbon dioxide in excess of a calculated mass of carbon dioxide based on a reaction between the ammonia and the carbon dioxide.

9. The method of claim 6, wherein the mineral is an alkaline earth metal phosphate.

10. A method of treating the surface of a material, the method comprising the steps of:
    (a) contacting the surface of the material with a composition comprising at least 40 wt % of an amino compound; and
    (b) contacting the surface of the material with a composition comprising carbon dioxide or a source thereof having a pressure of between 150 kPa and 3000 kPa,
    wherein the material is a cellulosic material comprising natural fibers, and wherein the composition used in step (b) comprises neat carbon dioxide or further comprises a diluent or carrier; and
    wherein step (b) comprises contacting the material with a composition comprising superheated water having dissolved therein carbon dioxide and one or more benefit agents, and wherein the deposition of the carbon dioxide and/or one or more benefit agents onto the surface of the material may be initiated by a drop in pressure and/or a drop in temperature and/or a change in pH.

11. The method of claim 10, wherein the composition comprising carbon dioxide or a source thereof has a pressure between 1000 kPa and 3000 kPa.

12. The method of claim 1, wherein the composition comprising carbon dioxide has a pressure between 1000 kPa and 3000 kPa.

* * * * *